United States Patent [19]

Dettmer

[11] Patent Number: 5,293,591

[45] Date of Patent: Mar. 8, 1994

[54] PROCESSING SYSTEM INCLUDING MEMORY SELECTION OF MULTIPLE MEMORIES AND METHOD IN AN INTERRUPT ENVIRONMENT

[75] Inventor: David R. Dettmer, Austin, Tex.

[73] Assignee: Advanced Micro Devices, Inc., Sunnyvale, Calif.

[21] Appl. No.: 712,944

[22] Filed: Jun. 10, 1991

[51] Int. Cl.⁵ ............................................. G06F 12/00
[52] U.S. Cl. .................................... 395/375; 395/725;
364/DIG. 1; 364/243; 364/244.6; 364/238.4
[58] Field of Search ............... 395/275, 325, 700, 725, 395/775, 425, 375

[56] References Cited

U.S. PATENT DOCUMENTS

| | | | |
|---|---|---|---|
| 4,326,247 | 4/1982 | Chamberlin | 395/800 |
| 4,484,271 | 11/1984 | Miu et al. | 395/375 |
| 4,603,384 | 7/1986 | Brantingham et al. | 395/425 |
| 4,685,084 | 8/1987 | Canepa | 365/189 |
| 4,787,032 | 11/1988 | Culley | 395/725 |
| 4,791,603 | 12/1988 | Henry | 364/900 |
| 4,839,628 | 6/1989 | Davis et al. | 340/311.1 |
| 4,984,213 | 1/1991 | Abdoo et al. | 365/230.3 |
| 5,008,816 | 4/1991 | Fogg, Jr. et al. | 395/425 |
| 5,047,989 | 9/1991 | Canepa et al. | 365/238.5 |
| 5,146,581 | 9/1992 | Kaneko | 395/425 |

Primary Examiner—Thomas C. Lee
Assistant Examiner—Mehmet Geckil
Attorney, Agent, or Firm—Foley & Lardner

[57] ABSTRACT

A processing system includes memory page selection of multiple memory pages in an interrupt environment. The processing system includes a processor and memory page selection control for selecting one memory page responsive to a first address generated by the processor and another memory page responsive to a second address generated by the processor. The memory page selection control includes a page latch which can be overridden by an interrupt to permit the processor to service an interrupt from one of the pages but which returns the processor to the memory page from which it was fetching program instructions at the time of the interrupt. To coordinate page selection, the processor executes program instructions from dedicated paging instructions including interface modules, decode modules, and transition modules stored in each page which are configured to assure smooth page transitions and efficient interrupt servicing.

64 Claims, 8 Drawing Sheets

PROCESSING SYSTEM INCLUDING MEMORY SELECTION OF MULTIPLE MEMORIES AND METHOD IN AN INTERRUPT ENVIRONMENT

BACKGROUND OF THE INVENTION

The present invention generally relates to a processing system including a processor, a primary memory, a secondary memory and a memory select control for selecting either the primary or secondary memory. The present invention more particularly relates to such a system wherein memory selection is accommodated in an interrupt environment and wherein memory transition is performed in real time without the need to decrease processing efficiency by inserting wait states during memory transitions.

Processing systems generally include a processor which executes program instructions and a memory which stores and provides the program instructions to the processor. The processor is arranged to generate memory addresses which are conveyed to the memory for fetching the program instructions which are stored at corresponding addresses in the memory. Since the number of address bits which the processor can generate is limited, the number of byte storage locations of the memory which can be addressed by the processor is limited to the number of possible binary combinations of the address bits. For example, a processor which generates sixteen address bits is capable of generating 64,000 different addresses for addressing a memory having up to a 64,000 byte storage capacity.

There are times when the number of program instructions required to be executed by a processor in order to provide all of its necessary functions is greater than the number of different addresses which the processor can generate and hence, greater than the number of storage locations existing in the processor's memory. In such a case, a secondary memory must be added to the processing system. This, however, requires at least one additional address bit to enable selection between the memories. For instance, in the above-mentioned example, if an additional 64,000 byte memory is added to the existing 64,000 byte memory, a seventeenth address bit would be required to permit selection of the two memories. The first sixteen address bits can still then be used to address the program instructions contained in either memory.

In the prior art, one way of achieving memory selection between a primary memory and a secondary memory has been to write a first data value to a given sixteen bit address for selecting one memory and to write a second data value to the same sixteen bit address for selecting the other memory. A memory selection control decodes the data for selecting the proper memory. Once the proper memory is selected, the processor is then enabled to access the program instructions contained in the selected memory by generating the sixteen bit addresses.

While the foregoing has provided a solution to memory selection, as a practical matter, it can be difficult to implement. The reason for this disadvantage is that the data value requires eight bits and correspondingly eight pins on the memory selection control to receive the data. This means that the memory selection control must have twenty-four external pins for memory selection, sixteen pins for the address and eight pins for the data. Such an inordinate number of the external pins is not always available or practical to provide.

In addition to the foregoing, when a processing system is to be operated in an interrupt environment, one in which normal processing is interrupted by external interrupt conditions, processing systems have not provided an efficient means to accommodate such interrupts. For example, in such an environment it would be advantageous to be able to handle an interrupt through the execution of an interrupt service routine and then automatically, after completion of the interrupt service routine, to return the processor to the program it was executing at the time of the interrupt and more particularly, to the point in the program where the processor was when the interrupt occurred. It would further be advantageous, after completing an interrupt service routine, to also return the processor to the memory it was utilizing at the time of the interrupt without having to again sequence the processor through the memory selection process.

It would also be advantageous to assure smooth transition of the processor from one memory to the other without slowing the processor down by introducing wait states. Lastly, it would be to advantage to configure the memories to minimize the frequency of memory selection transitions while providing all of the necessary processing routines, including the interrupt service routines, with all of the supporting parameters and instructions required by the routines.

SUMMARY OF THE INVENTION

The present invention provides a processing system including a processor for executing program instructions wherein the processor is arranged to generate addresses having a plurality of address bits. The processing system further includes primary and a secondary memory for storing first and second sets of program instructions and being coupled to the processor for providing the processor with the stored program instructions responsive to the addresses. The processing system further includes a memory select control coupled between the processor and the primary and secondary memories for selecting either one of the memories. The memory select control is responsive to a first address generated by the processor for selecting the primary memory and responsive to a second address generated by the processor for selecting the secondary memory wherein the second address is different than the first address.

The present invention further provides a processing system including a processor for executing program instructions wherein the processor is arranged to generate addresses having a plurality of address bits for fetching the program instructions. The processing system further includes a primary memory for storing a first set of program instructions and being coupled to the processor for providing the processor with the stored first set of program instructions responsive to the addresses. The processing system further includes a secondary memory for storing a second set of program instructions and being coupled to the processor for providing the processor with the second set of program instructions responsive to the addresses. The processing system further includes memory select control coupled between the processor and the primary and secondary memories for selecting one of the memories. The memory select control includes a latch arranged to be in a first or second state, wherein the latch is in the first state for selecting the primary means responsive to a first address generated by the processor and in a second state for selecting the secondary memory responsive to a second address generated by the processor.

The present invention further provides a processing system including a processor for executing program instructions wherein the processor is arranged to generate addresses for fetching program instructions. The processing system further includes primary and secondary memories for storing first and second sets of execution program instructions and transition program instructions and being coupled to the processor for providing the processor with the stored instructions. The processing system further includes a memory select control coupled between the processor and the primary and secondary memories for selecting either one of the memories. The memory select control is responsive to a first address generated by the processor for selecting the primary memory and responsive to a second address generated by the processor for selecting the second memory wherein the second address is different than the first address. The processor is responsive to the transition program instructions fetched from one of the memories for generating one of the first or second addresses to cause the memory select control to select the other memories when the execution of execution program instructions by the processor requires the execution of execution program instructions from the other memory.

The first set of program instructions preferably include interrupt service routine instructions to permit the processor to execute interrupt service routines and the memory select control selects the primary memory responsive to the processor generating an address corresponding to any one of the interrupt service routine instructions to execute an interrupt service routine. The memory select control selects the primary memory, regardless of the state of a latch, responsive to the processor generating an address corresponding to any one of the interrupt service routine instructions.

The present invention still further provides a method for use in a processing system of the type including a processor and primary and secondary memories wherein the memories are addressable by the processor for fetching program instructions. The method selects either the primary memory or the secondary memory for accessing by the processor and includes the steps of providing a memory select control coupled to the processor and to the primary and secondary memories wherein the memory select control is responsive to a first address from the processor for selecting the primary memory and is responsive to a second address from the processor for selecting the secondary memory. The method further includes the steps of providing the first address from the processor to cause the memory select control to select the primary memory and providing the second address from the processor to cause the memory select control to select the secondary memory.

The method ma also include the further steps of storing interrupt service routine instructions in the primary memory to permit the processor to execute interrupt service routine instructions and causing the memory select control to select the primary memory whenever the processor provides an address corresponding to one of the interrupt service routine instructions.

BRIEF DESCRIPTIONS OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference characters identify identical elements, and wherein:

DETAILED DESCRIPTION OF THE PREFERRED EMBODIMENT

Figure 1:
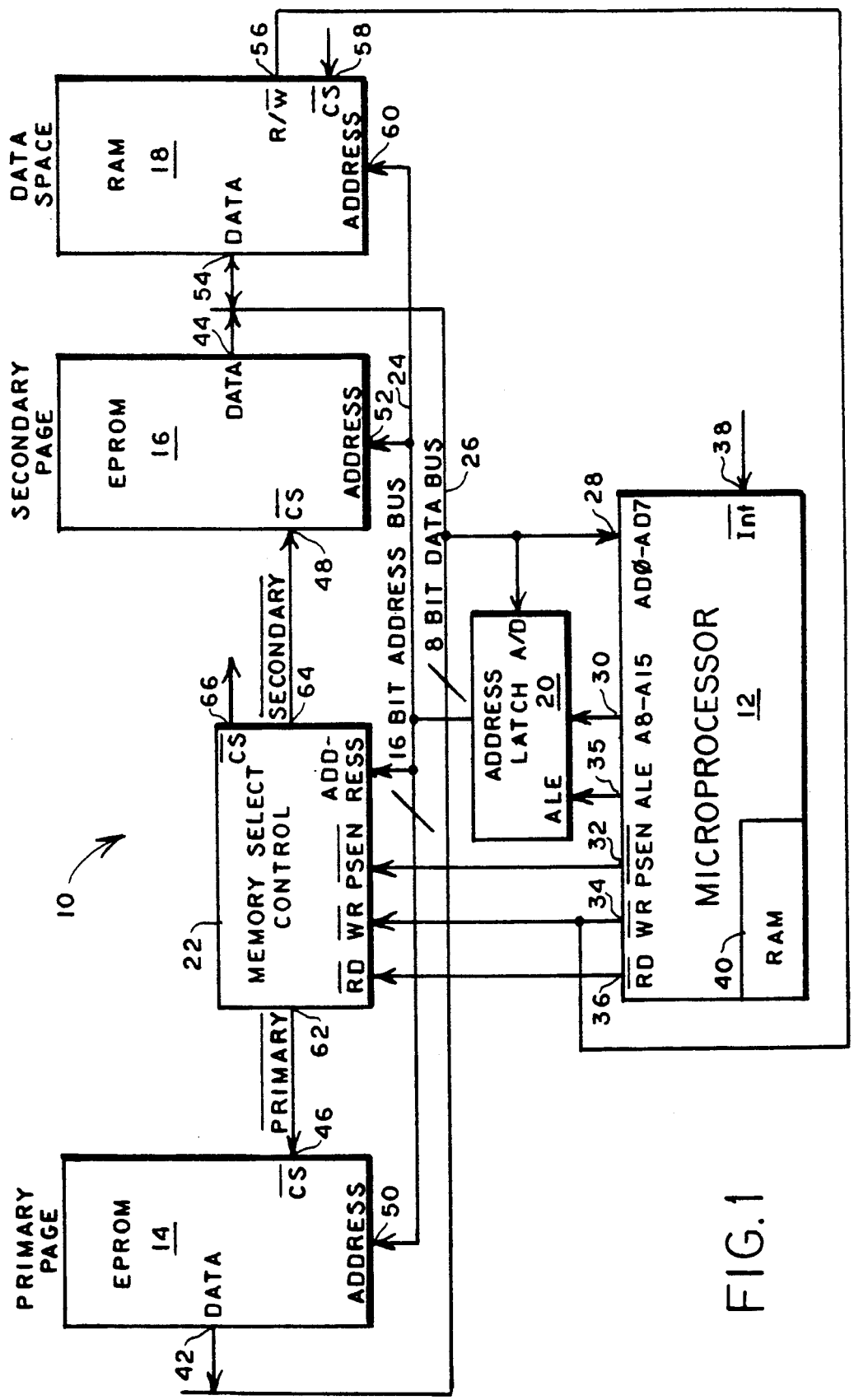
FIG. 1 is a detailed block diagram of a processing system embodying the present invention.

Referring now to FIG. 1, it illustrates in block diagram form, a processing system 10 embodying the present invention. The processing system 10 generally includes a processor 12, a primary memory 14 hereinafter referred to as the primary page, a secondary memory 16 hereinafter referred to as the secondary page, and a third memory 18 hereinafter referred to as the random access memory. The processing system 10 further includes an address latch 20 and a memory select control 22. The processing system 10 further includes a 16 bit address bus 24 coupled from the address latch 20 to the primary page 14, the memory select control 22, the secondary page 16, and the random access memory 18. An eight-bit data bus 26 is coupled to the processor 12, the primary page 14, the secondary page 16, the random access memory 18, and the address latch 20.

The processor 12 is preferably of the type referred to in the art as an 8051 microprocessor. This type of microprocessor is arranged to generate addresses containing sixteen bits for fetching, for each address, a program instruction byte containing eight bits from either the primary page 14 or secondary page 16 or an eight-bit byte of data. The bytes of data and program instructions are provided to the processor 12 over the data bus 26 The sixteen-bit addresses from the processor 12 are provided to the primary page 14, the secondary page 16, the random access memory 18, and the memory select control 22 over the address bus 24.

In accordance with the 8051 type processor, the processor 12 is arranged to provide the eight-bit least significant byte of each address at a port 28 and the eight-bit most significant byte of each address at an output 30 for generating the addresses containing sixteen bits. The port 28 is also shared for writing eight-bit bytes of data to the random access memory 18 and for receiving eight-bit bytes of data or program instructions. During the first half of each accessing cycle, the processor 12 provides the least significant address byte to the address latch 20 along with an address latch enable control signal (ALE) to cause the address latch 20 to latch the least significant byte of the address. Throughout the access cycle, the microprocessor 12 also provides the most significant byte of the address to the address latch 20. By latching the least significant byte of the address, the address latch 20 combines the least significant address byte and the most significant address byte to provide the address bus 24 with each sixteen-bit address. During the second half of each access cycle, the processor 12 then conditions the port 28 to either provide a eight-bit byte of data for a write access or to receive an eight-bit byte of data or program instruction for a read access. Although this preferred embodiment is directed to a processing system utilizing a processor of the type generally referred to in the art as an 8051 microprocessor, it will be appreciated by those skilled in the art that the present invention may be utilized to advantage in processing systems incorporating other types of microprocessors as well.

For controlling the accesses by the processor 12, the processor 12 includes control outputs 32, 34, 35, and 36. Output 32 provides the program store enable control signal (active low) to the address latch 20 and the memory select control 22. Output 34 provides a write control signal ($\overline{WR}$) to the memory select control 22 as a first conditioning signal to be explained hereinafter and to the random access memory 18. When the write control signal is a low logic level, the random access memory is conditioned to receive data from the processor and when the write control signal is a high logic level, the random access memory 18 is conditioned to provide data to the processor. Output 35 provides the address latch enable control signal (ALE). Lastly, the output 36 provides a read control signal ($\overline{RD}$) to the memory select control 22 to provide a second conditioning control signal as will be explained hereinafter.

The processing system 10, as will be seen hereinafter, is capable of handling interrupt conditions which are external conditions which require the microprocessor 12 to suspend the execution of its processing and to service the interrupt by executing an interrupt service routine. For sensing interrupts, the processor 12 includes an interrupt input 38 and an internal random access memory 40. When an interrupt occurs and is sensed at the input 38, the microprocessor 12 completes the execution of the program instruction which it is then executing and stores the address of the next program instruction to be executed upon return to normal processing after completion of the interrupt service routine in the random access memory 40. The processor 12 is capable of stacking such next addresses to be executed in the event that more than one interrupt is sensed prior to the completion of a normal program routine or an interrupt service routine. As a result, the processor 12 returns to the program which it was executing at the time of the interrupt and more particularly to the next address in the program upon completion of an interrupt service routine to continue normal processing.

The primary and secondary memories or pages 14 and 16 respectively comprise read only memories and preferably, erasable programmable read only memories. Each of the primary and secondary pages 14 and 16 include an output 42 and 44 coupled to the data bus 26 for providing the microprocessor 12 with either a program instruction byte or a data constant byte during each microprocessor access. The primary and secondary pages 14 and 16 further include a chip select input 46 and 48 respectively for receiving from the memory select control 22 chip select control signals for selecting either the primary page or the secondary page. When the primary page is selected, the chip select input 46 of the primary page will be a low logic level and the chip select input 48 of the secondary page will be a high logic level. Conversely, when the secondary page is selected, the chip select input 48 of the secondary page 16 will be a low logic level and the chip select input 46 of the primary page 14 will be a high logic level. Lastly, the primary and secondary page 14 and 16 each include an address input 50 and 52 respectively which are coupled to the address bus 24 for receiving the sixteen-bit addresses provided by the processor 12.

The random access memory 18 includes a port 54 coupled to the data bus 26 for receiving eight-bit bytes of data from the processor 12 or for providing eight-bit bytes of data to the processor 12. The random access memory also includes a read/write control input 56 which is coupled to the control output 34 of the processor 12 for receiving the read and write control signals from the processor 12. The random access memory also includes a chip select input 58 for receiving a chip select control signal from an output 66 of the memory control 22 and an address input 60 coupled to the address bus 24 for receiving the sixteen-bit addresses provided by the microprocessor 12.

The memory select control 22 is arranged to select either the primary page 14 or the secondary page 16 responsive to first and second addresses respectively issued by the microprocessor 12 to permit the microprocessor 12 to execute program instructions obtained from either the primary page 14 or the secondary page 16 respectively. As will be seen hereinafter, the memory select control 22 includes a page latch which is set for selecting the secondary page responsive to the second address and which is reset for selecting the primary page responsive to the first address. As will also be seen hereinafter, the primary page 14 contains all of the interrupt service routine program instructions of the processing system 10 and the memory select control 22 overrides the page latch to permit the microprocessor 12 to execute interrupt service routine program instructions from the primary page irrespective of the set or reset condition of the page latch.

If the microprocessor 12 is executing program instructions obtained from the secondary page 16, the page latch will be set, and should an interrupt condition occur, the memory select control 22 will override the page latch responsive to an address obtained from the microprocessor corresponding to any one of the interrupt service routine program instructions to select the primary page 14 for execution of the interrupt service routine. After the interrupt service routine is completed, the page latch of the memory select control 22 will return the memory select control 22 to select the secondary page 16 responsive to the set condition of the page latch. As a result, the page latch permits the memory select control to reselect the memory page previously selected at the time an interrupt condition occurred after the interrupt service routine is completed without requiring page selection by the microprocessor 12 generating either the first or second address.

For selecting either the primary page 14 or the secondary page 16, the memory select control 22 includes a first output 62 which is coupled to the chip select input 46 of the primary page 14 and a second output 64 which is coupled t the chip select input 48 of the secondary page 16. When selecting the primary page 14, the output 62 will be at a logical zero and the output 64 will be at a logical one. When the secondary page 16 is selected, the output 64 will be at a logical zero and the output 62 will be at a logical one. The manner of generating the page selection control signals will be described subsequently with respect to the circuit diagram of FIG. 5.

The memory select control 22 is further arranged for selecting the random access memory 18 when it is necessary for the microprocessor 12 to write data to the random access memory 18 or read data from the random access memory. The memory select control 22 selects the random access memory 18 by providing a chip select signal at the output 66 which is conveyed to the chip select input 58 of the random access memory 18. The actual connection between the output 66 of the memory select control 22 and the chip select input 58 of the random access memory 18 is not shown in FIG. 1 so as to not unduly complicate the Figure. Along with the chip select signal provided to the input 58 of the random access memory, the microprocessor 12 provides a read/write control signal to input 56 to condition the random access memory 18 for either a read or a write operation when the random access memory 18 is selected. The memory select control 22 may select the random access memory 18 in a manner well known to those skilled in the art and therefore need not be described in further detail herein.

Figure 2:
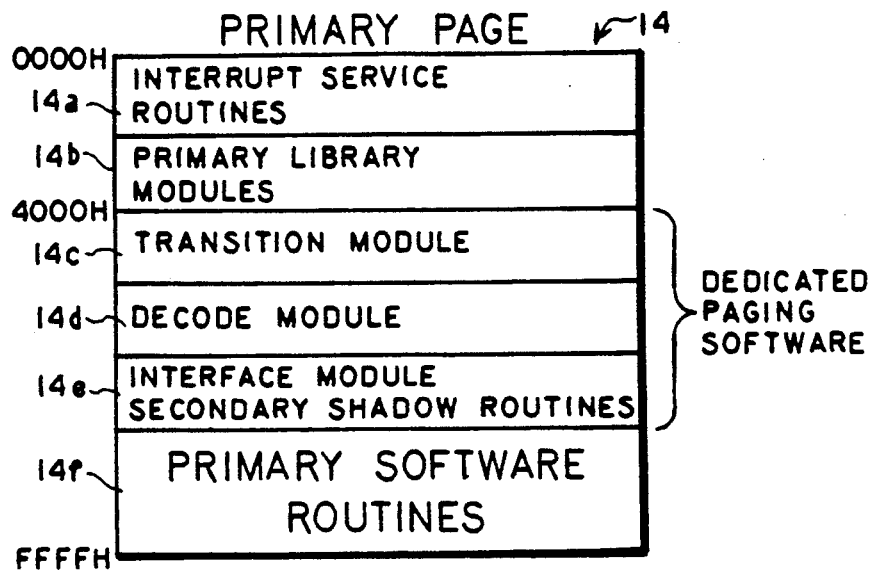
FIG. 2 is a block diagram illustrating the configuration of the primary page 14 of FIG. 1.

Referring now to FIG. 2, it diagrammatically illustrates the configuration of the primary page 14. As previously mentioned, the microprocessor 12 is capable of generating addresses containing sixteen bits. The number of binary combinations of the sixteen bits results in the microprocessor 12 being able to access a memory having a capacity of 64,000 bytes with each byte corresponding to a respective one of the addresses. As a result, the primary page 14 preferably has a storage capacity of 64,000 bytes which are accessible by the microprocessor 12 starting at an address 0000H and ending at an address of FFFFH.

The interrupt service routine program instructions of the processing system 10 are stored in the primary page 14 at contiguous memory storage locations starting with the first memory page address of 0000H. The interrupt service routines are illustrated as being stored in the interrupt service routines portion 14a. Stored immediately after the interrupt service routines 14a are the primary library modules 14b of the primary page 14. As is well known in the art, library modules are program instructions which define frequently used standard functions. The primary library modules are stored with the interrupt service routines because the execution of the interrupt service routines will require access to the primary library modules by the microprocessor. As will be noted in FIG. 2, the interrupt service routines 14a and the primary library modules 14b are stored in the first quarter of the primary page 14 from addresses 0000H to 3FFFH.

Starting with address 4000H the primary page 14 includes dedicated paging software program instructions which control the transitions from the primary page 14 to the secondary page 16. The dedicated paging software includes transition program instructions contained within a transition module 14c, decode program instructions contained within a decode module 14d, and interface program instructions contained within an interface module 14e. The interface module 14e also includes secondary shadow routines. The execution program instructions stored within the primary page 14 and secondary page 16 are stored as execution modules which are not duplicated within the primary page 14 and secondary page 16. As a result, the secondary shadow routines included within the interface module 14e identify the execution modules stored in the secondary page 16 which are called upon by the execution modules of the primary page 14 for execution. The secondary shadow routines stored in the interface module 14e include an identifying index number for each shadow routine and the identification of any necessary parameters which will be required by the processor in executing the execution module of the secondary page 16 corresponding to the shadow routines.

Lastly, the primary page includes its primary software routines 14f. The primary software routines include the execution modules of the primary page 14 and are completely relocateable as long as they are located above the dedicated paging software including the transition module 14c, the decode module 14d, and the interface module and secondary shadow routines 14e.

The transition module 14c includes a program instruction which, as will be seen hereinafter, causes the microprocessor 12 to generate the second address for setting the page latch for selecting the secondary page 16 to permit the microprocessor t fetch instructions from the second page for executing program instructions of the second page. In accordance with this preferred embodiment, the second address for setting the page latch is 1000H.

The decode module 14d includes program instructions which cause the microprocessor 12 to decode the primary shadow routine index numbers provided by the secondary page and to cause the microprocessor 12 to address the execution module within the primary page portion 14f for executing the execution module required to be executed. The manner in which the dedicated paging software may be implemented will be described subsequently.

Figure 3:
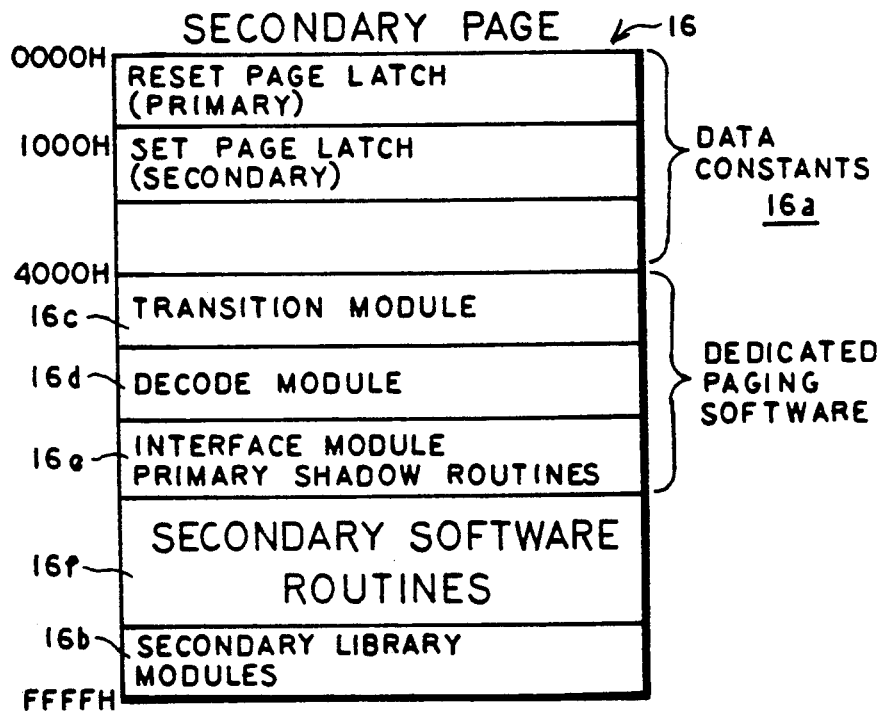
FIG. 3 is a block diagram illustrating the configuration of the, secondary page 16 of FIG. 1.

Referring now to FIG. 3, it diagrammatically illustrates the configuration of the secondary page 16. Like the primary page 14, the secondary page 16 is a read-only memory and preferably an erasable programmable read-only memory having a 64,000 byte storage capacity and being addressable from address 0000H to FFFFH. The first quarter of the secondary page 16 from address 0000H to 3FFFH is reserved for storing data constants 16a which corresponds to the addresses of the interrupt service routines 14a and primary library modules 14b of the primary page 14. The data constants are static values which are needed by various software modules of the processing system 10. Because the static values do not change, they are located in one of the read-only memories of the system rather than in the random access memory. Storing the data constants in the secondary page allows more space in the primary page 14 for its primary software routines.

As illustrated, the reset address for the page latch is 0000H. This address is a result of the system hardware, and more specifically, the memory select control circuit of FIG. 5 to be described hereinafter which is not software relocateable. The secondary page transition module 16c causes the processor 12 to write this address for selecting the primary page. Also illustrated is the set address for the page latch which is 1000H. This address is also a result of the system hardware and is not software relocateable. The primary page transition module 14c causes the microprocessor to write this address for selecting the secondary page.

The next portion of the secondary page beginning at address 4000H includes the dedicated paging software of the secondary page 16 which includes transition program instructions in transition module 16c, decode program instructions in decode module 16d, and interface program instructions and primary shadow routines in the interface module and primary shadow routines portion 16e. The transition module 16c includes program instructions which correspond directly to the transition program instructions contained within the transition module 14c of the primary page 14. Preferably, corresponding transition program instructions of the transition module 14c of primary page 14 and transition program instructions of the transition module 16c of the secondary page 16 are located at identical addresses. As will be seen hereinafter, this provides a smooth transition from the primary page to the secondary page and from the secondary page to the primary page. The only difference in the transition program instructions of the transition module 16c from the program transition instructions of the transition module 14c is that the transition program instructions of the transition module 16c cause the microprocessor 12 to generate the reset address for the page latch for selecting the primary page.

The program instructions of the decode module 16d and the interface module and primary shadow routines 16e serve the same functions as the corresponding sections 14d and 14e of the primary page 14. To that end, the decode module 16d decodes the shadow routine indexes provided by the primary page 14, causes the appropriate execution module to be executed from the secondary page, and returns any value required to be returned for continued execution from the primary page once the execution module in the secondary page is completed.

The interface module 16e contains the shadow routines of those execution routines in the primary page which are required by the execution modules of the secondary page along with the identifier index of those shadow routines. In addition, the interface module includes the identity of all parameters required to execute the routines from the execution modules in the primary page which correspond to the shadow routines in the secondary page and also program instructions for writing those parameters before a page transition from the secondary page to the primary page.

The next portion of the secondary page 16 includes the execution modules in the secondary software routines portion 16f. The last portion of the secondary page 16 includes the secondary library modules 16b.

Preferably, the execution modules stored in portion 14f of the primary page 14 are related to minimize page transitions. Similarly, the execution modules contained in portions 16f of the secondary page 16 are related to minimize page transitions. To further minimize page transitions, each execution module is contained totally within one of the respective pages of either the primary page 14 or the secondary page 16.

Figure 4:
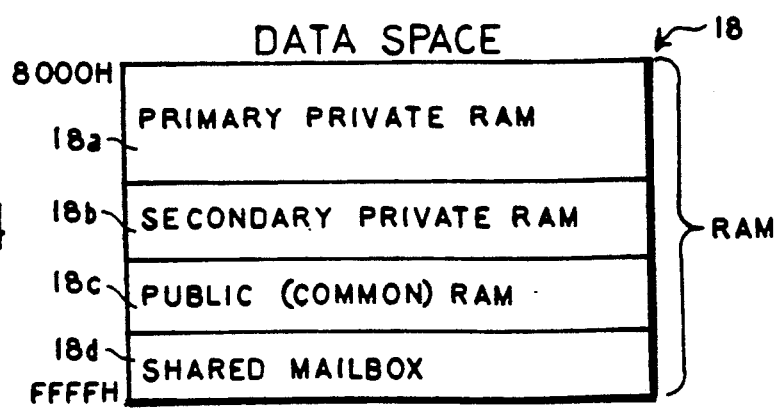
FIG. 4 is a block diagram illustrating the configuration of the random access memory 18 of FIG. 1.

Referring now to FIG. 4, it diagrammatically illustrates the configuration of the random access memory 18. The random access memory includes a first portion 18a which is utilized by the microprocessor when executing execution modules only from the primary page 14. The next section 18b is utilized by the microprocessor when executing execution modules from only the secondary page 16. The third portion 18c is utilized by the microprocessor when executing execution modules from both the primary page 14 and the secondary page 16. Lastly, the fourth portion 18d comprises a shared mailbox which is utilized by the microprocessor for writing the shadow routine indexes, necessary parameters for executing the actual routines, and for writing return values after the execution of an execution module of one page prior to the transition back to the originating page. The random access memory 18 preferably has a 32,000 byte storage capacity and is preferably addressable by the microprocessor starting at address 8000H to the last address of FFFFH.

Each shadow routine stored in the transition modules 14c and 16c of the primary page 14 and secondary page 16 corresponds to each execution module residing in the opposite page which is called by a module in the current page. The shadow routine may have the same name as the actual routine residing in the opposite page, but does not contain any of the substance of the actual routine. Instead, the shadow routine loads all parameters needed by the actual routine into the shared mailbox 18d of the random access memory 18 for later use by the actual module in the opposite page after the page latch is written. Maintaining the same module name for the shadow routine and the actual module has the advantage of ease of maintenance during software development, since the software developer may wish to move some execution modules from one page to the other without the burden of changing the module names everywhere it appears in the source software. For example, assume "module a" was originally residing in the primary page and executed only from other modules inside the primary page. Later, the software developer moved it to the secondary page, and created a shadow routine also called "module a" to avoid editing all primary page modules.

Since each software page may be compiled and linked separately, the physical addresses of the actual modules to be executed are not known by the interface module of the opposite software page. Therefore, arbitrary module index numbers are assigned to each needed module in the opposite page. The interface module loads the corresponding module index number into the shared mailbox 18d, and the decode module of the opposite page later retrieves the module index and translates it into the corresponding execution module to be executed. After the mailbox 18d is properly loaded, the transition module causes the microprocessor to write the page latch immediately before execution continues in the opposite software page. If the execution module to be executed creates any output which is to be returned on the completion of the execution modules, the decode module loads this return value into the shared mailbox 18d which is later retrieved by the interface module of the opposite or original page.

Figure 5:
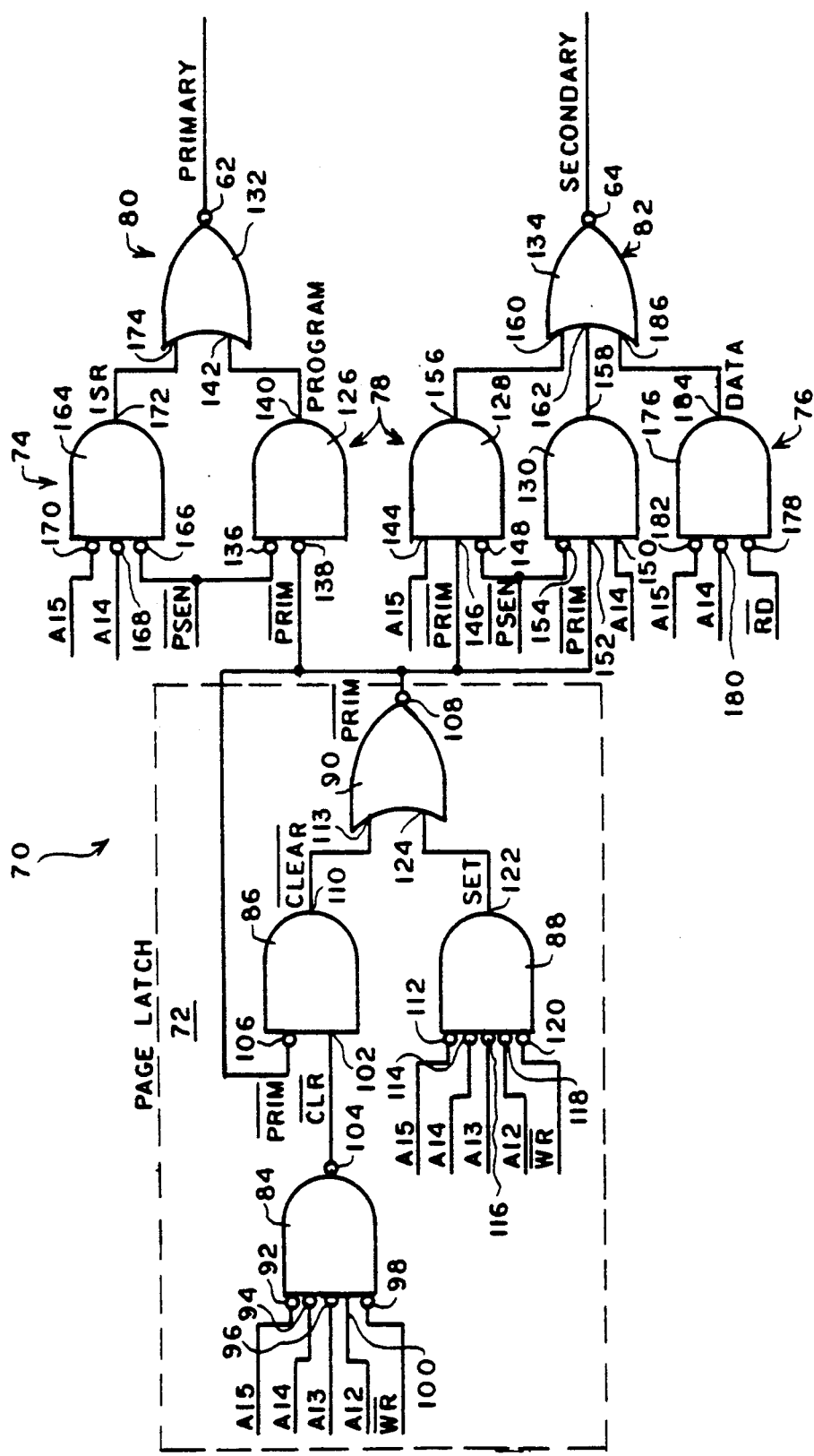
FIG. 5 is a schematic circuit diagram of a memory select control circuit of the memory select control of FIG. 1.

Referring now to FIG. 5, it illustrates in schematic circuit diagram form the memory select control circuit 70 of the memory select control 22 which selects either the primary page or the secondary page responsive to selected addresses generated by the microprocessor 12. The memory select circuit 70 generally includes a latch 72, herein referred to as the page latch, an interrupt service routine override 74, a data constant read override 76, logic 78, and output gates 80 and 82. The memory select circuit 70 is preferably implemented by selectively configuring a programmable logic array but alternatively could be integrated within a customized integrated circuit.

The page latch 72 includes a NAND gate 84, an AND gate 86, an AND gate 88, and a NOR gate 90. The NAND gate 84 includes inverting inputs 92, 94, 96 and 98 and a noninverting input 100. AND gate 86 includes an input 102 coupled to the output 104 of NAND gate 84 and an inverting input 106 which is coupled to the output 108 of NOR gate 90 which forms the output of the page latch 72. AND gate 86 also includes an output 110 which is coupled to an input 113 of NOR gate 90. AND gate 88 is implemented to provide the NOR function by virtue of all of its inputs 112, 114, 116, 118, and 120 being inverting inputs. AND gate 88 also includes an output 122 which is coupled to the other input 124 of NOR gate 90.

In accordance with this preferred embodiment, the first and second addresses generated by the microprocessor 12 for either resetting or setting the page latch 72 respectively for in turn selecting either the primary page 14 or secondary page 16 respectively are sixteen bit addresses wherein the first twelve bits (A0–A11) are all logical zeros. The difference between the first and second addresses resides in the thirteenth address bit (A12) which is a logical zero when the page latch 72 is reset for selecting the primary page and a logical one when the page latch 72 is being set for selecting the secondary page. The remaining address bits (A14–A16) for both the first and second addresses are all logical zeros. As a result, to reset the page latch 72, the microprocessor 12 generates the sixteen bit address corresponding to OOOOH. To set the page latch 72, the microprocessor 12 generates the sixteen bit address corresponding to 1OOOH.

As will be noted in FIG. 5, inputs 100, 96, 94, and 92 of NAND gate 84 are coupled to the address bus 24 for receiving address bits A12, A13, A14, and A15 respectively. Similarly, inputs 118, 116, 114, and 112 of AND gate 88 are coupled to the address bus 24 for receiving address bits A12, A13, A14, and A15 respectively.

When the microprocessor 12 writes the first address to the page latch 72 to reset the page latch for selecting the primary page 14, the output 108 of the page latch 72 will be a logical zero. When the microprocessor 12 writes the second address to the page latch 72 for setting the page latch and selecting the secondary page 16, the output 108 of the page latch 72 will be a logical one. As will be seen hereinafter, the page latch 72 provides memory for identifying the memory page previously selected at the time the page latch is overridden by the microprocessor executing either an interrupt service routine from the primary page or executing a data constant read from the secondary page.

The logic 78 includes AND gates 126, 128, and 130 and the output gates 80 and 82 are formed by NOR gates 132 and 134 respectively. AND gate 126 is configured to provide a NOR function because its inputs 136 and 138 are inverting inputs. Input 136 is coupled to the microprocessor 12 for receiving the program store enable control signal and input 138 is coupled to the output 108 of the page latch 72. The output 140 of AND gate 126 is coupled to one input 142 of NOR gate 132.

AND gate 128 includes a first input 144 which is coupled to the address bus 24 for receiving the sixteenth address bit (A15), a second input 146 which is coupled to the output 108 of the page latch 72, and an inverting input 148 which is coupled to the microprocessor 12 for receiving the program store enable control signal. Similarly, AND gate 130 includes a first input 150 which is coupled to the address bus 24 for receiving the fifteenth address bit (A14), a second input 152 which is coupled to the output 108 of the page latch 72, and an inverting third input 154 which is coupled to the microprocessor 12 for receiving the program store enable control signal.

The outputs 156 and 158 of AND gates 128 and 130 respectively are coupled to inputs 160 and 162 of NOR gate 134. The outputs 62 and 64 of NOR gates 132 and 134 form the page selection outputs of the memory select control 22 as illustrated in FIG. 1.

When the page latch 72 has been reset by the microprocessor for selecting the primary page, output 62 will be at a logical zero and output 64 will be at a logical one. Conversely, when the page latch 72 has been set by the microprocessor for selecting the secondary page 16, output 62 will be at a logical one and output 64 will be at a logical zero.

The condition of the outputs 62 and 64 may be changed by the microprocessor to thus override the page latch 72 without changing the state of the output of the page latch 72 when the microprocessor executes an interrupt service routine after having been executing program instructions from the secondary page 16 or when executing a data constant read from the secondary page 16 after having been executing program instructions from the primary page 14. As previously mentioned, the interrupt service routines are stored in the primary page 14 at addresses between OOOOH and 3FFFH. As a result, when the microprocessor executes an interrupt service routine, it generates addresses corresponding to the interrupt service routine program instructions wherein the fifteenth and sixteenth address bits (A14 and A15) are both logical zeros. Whenever the microprocessor executes program instructions other than interrupt service routine program instructions, either one or both of the fifteenth and sixteenth address bits will be a logical one.

The interrupt service routine override 74 includes AND gate 164 which is configured to provide the NOR function by having inverting inputs 166, 168, and 170. Input 166 is coupled to the microprocessor 12 for receiving the program store enable control signal. Input 168 is coupled to the address bus 24 for receiving the fifteenth address bit (A14) and input 170 is coupled to the address bus 24 for receiving the sixteenth address bit (A15). The output 172 of AND gate 164 is coupled to the input 174 of NOR gate 132.

Whenever the microprocessor 12 executes an interrupt service routine, the addresses generated by the microprocessor will include logical zeros for the fifteenth and sixteenth address bits. This causes AND gate 164 to provide a logical one at output 172 and to cause NOR gate 132 to provide a logical zero at output 62. Also, outputs 156 and 158 of AND gates 128 and 130 will provide logical zeros and, since the read control signal is not asserted, output 64 of NOR gate 134 will be at a logical one. The logical zero at output 62 and the logical one at output 64 causes the primary page 14 to be selected for executing interrupt service routines without effecting the state of the page latch 72. When the microprocessor 12 completes the interrupt service routine, because the page latch 72 provides memory for identifying the previously selected page, the memory select control will return to select the previously selected primary or secondary page previously selected at the time the interrupt condition occurred.

The page latch 72 may also be overridden in a similar manner when the microprocessor 12 executes a data constant read from the data constant area of the secondary page 16. As previously mentioned, the data constants are stored in the secondary page between addresses OOOOH and 3FFFH. The data constant read override 76 includes AND gate 176 which is also configured to provide the NOR function by having inverting inputs 178, 180, and 182. Input 178 is coupled to the microprocessor 12 for receiving the read control signal. Input 180 is coupled to the address bus 24 for receiving the fifteenth address bit and input 182 is coupled to the address bus 24 for receiving the sixteenth address bit. AND gate 176 also includes an output 184 which is coupled to an input 186 of NOR gate 134.

When the microprocessor 12 executes a read from the data constants area of the secondary page 16, both of the fifteenth and sixteenth address bits will be at a logical zero. With these address bits being conditioned by the read control signal transitioning to an active logical zero level, the AND gate 176 will provide a logical one at output 184 to force the output 64 of NOR gate 134 to a logical zero. Because the data constant read is conditioned by the read control signal, the output 62 of NOR gate 132 will be at a logical one. With output 64 being a logical zero and output 62 being a logical one, the secondary page 16 is selected for reading a data constant. This selection occurs by overriding the page latch 72. When the data constant has been read, the page latch 72 causes the previously selected page to once again be selected.

Figure 6:
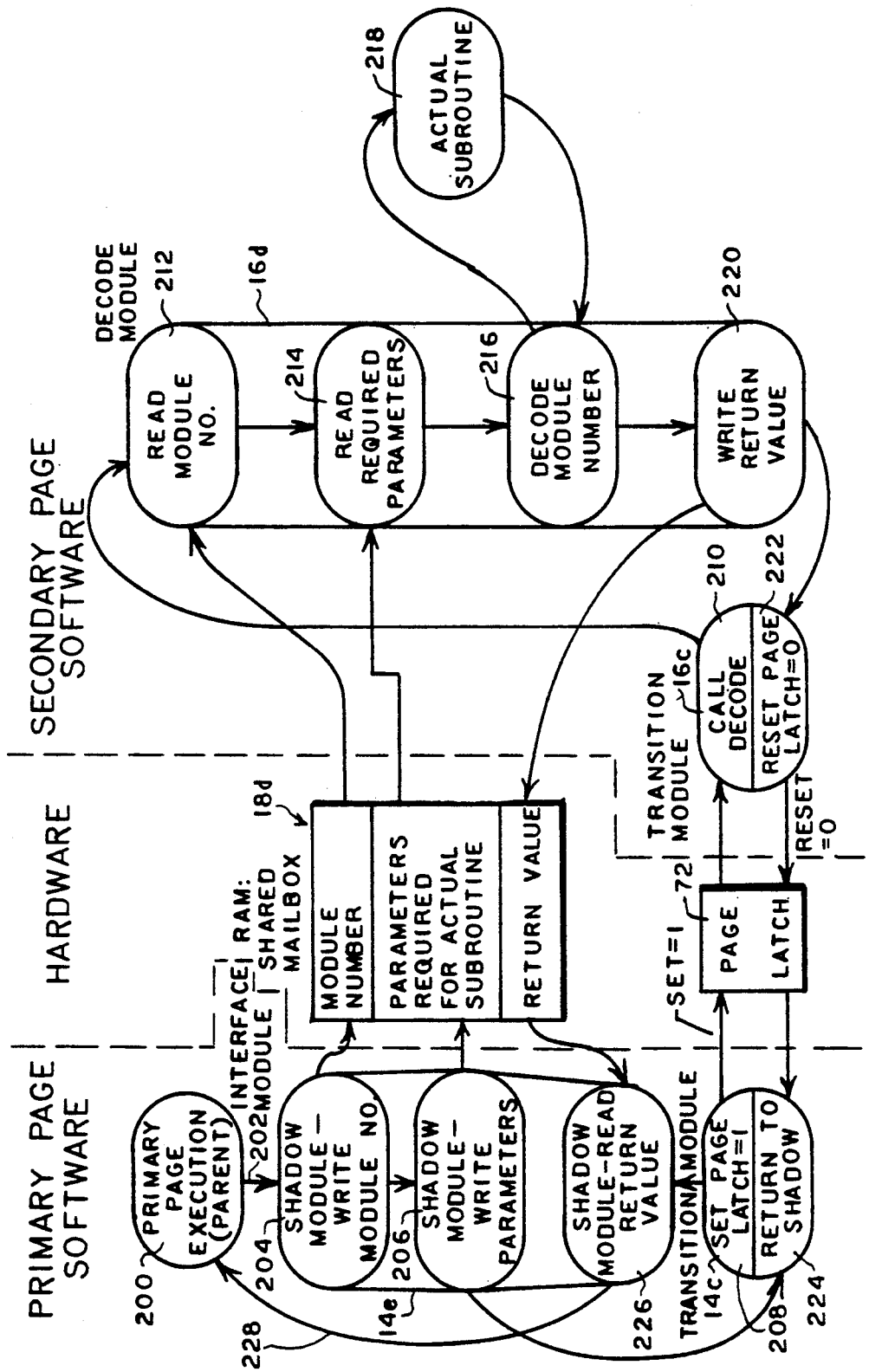
FIG. 6 is a diagrammatic illustration of the process steps performed by the microprocessor in transitioning from the primary page to the secondary page and then back from the secondary page to the primary page.

Referring now to FIG. 6, it diagrammatically illustrates the processing steps performed by the microprocessor 12 when transitioning from execution from the primary page to the secondary page and then returning from the secondary page to the primary page. Reference character 200 indicates that the microprocessor 12 is currently executing program instructions obtained from the primary page 14. In step 202 the microprocessor receives a program instruction from the primary page which calls a desired subroutine. The subroutine, called by way of example "module A" resides in the secondary page 16. Since module A cannot be executed from the primary page, the subroutine call is made to the primary page shadow routine by the same name which resides in the interface module 14e of the primary page 14.

In step 204 the interface module 14e causes the microprocessor 12 to write the predefined module index number corresponding to module A into the module number area of the shared mailbox 18d of the random access memory 18. This number is between one and the number corresponding to the maximum number of shadow routines which reside in the interface module 14e.

In step 206, the interface module also causes the microprocessor to write all parameters required by the actual module A residing in the secondary page into the parameter area of the shared mailbox 18d. The microprocessor then enters the transition module 14c in preparation for the page transition. In step 208 the transition module causes the microprocessor to disable all interrupts during the short page transition and then causes the microprocessor to set the page latch for execution from program instructions from the secondary page by writing the address 1OOOH to the page latch 72 of the memory select control 22. This write operation enables the secondary page and disables the primary page.

Immediately after the page transition, execution resumes in the transition module 16c of the secondary page which, in step 210 causes the microprocessor to reenable interrupt detection and servicing and to execute decode program instructions from the decode module of the secondary page 16. Next, in step 212, the microprocessor responsive to a decode program instruction reads the module number from the shared mailbox 18d. Next, in step 214, the microprocessor is caused by a decode program instruction to read all required parameters for the actual module A from the parameter area of the shared mailbox 18d.

The microprocessor is next called upon in step 216 by a decode program instruction to decode and translate the module index number into the corresponding module name, which in this example, is module A. The actual subroutine in step 218 is next performed by the microprocessor which includes the processing of the required parameters which have been read from the shared mailbox 18d.

When the execution of module A completes, it passes a return value back to the decode module which causes the microprocessor to write the return value in step 220 to the return value area in the shared mailbox 18d. Then, in step 222 the processor returns to the transition module 16c of the secondary page 16 in preparation for the transition t return back to the primary page 14. The transition module 16c first in step 222 disables all interrupts during the short page transition and then causes the microprocessor to reset the page latch 72 for execution from the primary page by writing the address OOOOH to the page latch 72. This write operation enables the primary page and disables the secondary page.

Immediately after the page transition to the primary page, execution by the processor resumes in the transition module 14c of the primary page where interrupts are reenabled in step 224. The processor then returns to the shadow module A within the interface module 14e and, in step 226 reads the return value from the shared mailbox 18d. Finally, the return value (from actual module A) is returned back to the original parent execution module in the primary page as indicated by the arrow 228 to permit the microprocessor to continue executing program instructions obtained from the primary page at step 200.

As previously mentioned, the transition program instructions of transition module 14c and the transition program instructions stored in transition module 16c correspond to one another and preferably, the corresponding transition program instructions are stored in the primary and secondary pages at identical address to permit smooth transition from one page to the other. For example, if the program instruction requiring the microprocessor to set the page latch resides at address 4006H to select the secondary page, the next instruction will be fetched by the microprocessor at address 4007H but from the secondary page transition module since the page latch has been written. This immediate page transition between addresses 4006H and 4007H is the reason why it is preferred that the transition module of each page be located at exactly the same addresses in both pages. As a result, the proper instructions will be addressed in the opposite page immediately after the page transition. The transition from the secondary page to the primary page and then the return from the primary page to the secondary page follows identical processing steps except that the transition from the secondary page to the primary page requires the page latch 72 to be reset and the transition from the primary page back to the secondary page requires the page latch to be set. As a result, the process steps for transitioning from the secondary page to the primary page and then from the primary page back to the secondary page is not repeated herein and will be readily apparent to those skilled in the art.

Figure 7:
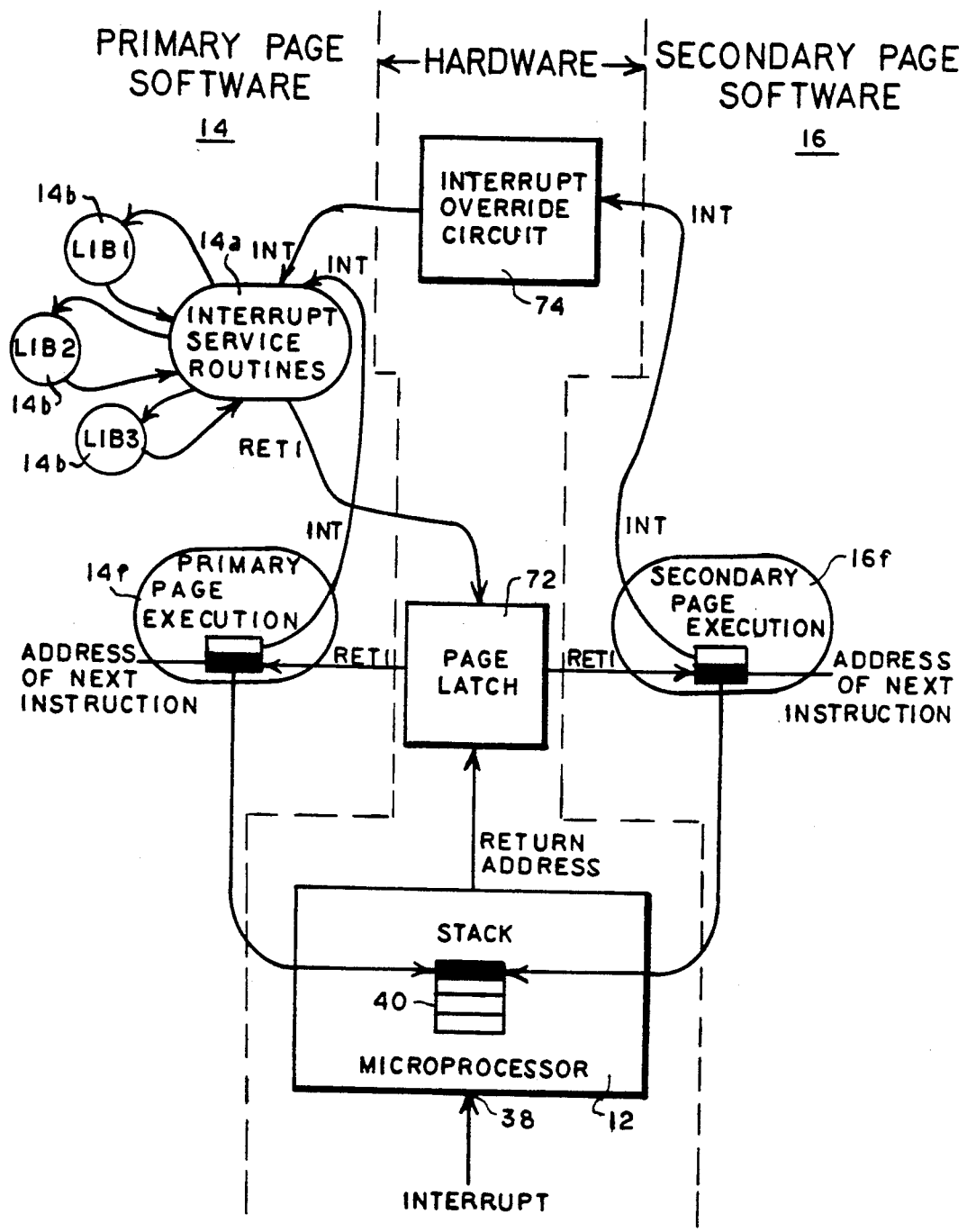
FIG. 7 is a diagrammatic illustration of the process steps performed by the microprocessor for page selection before, during, and after an interrupt condition.

Referring now to FIG. 7, it diagrammatically illustrates the program executions of the microprocessor 12 before, during, and after an interrupt occurs. FIG. 7 also illustrates the interrelationships between the hardware and the executions performed by the microprocessor pursuant to program instructions. The primary page 14 is represented on the left side of the figure and the secondary page 16 is represented on the right side of the figure. FIG. 7 also illustrates two possible paths which the microprocessor may take, one for the case when the microprocessor was executing from the primary page 14 when the interrupt occurred and the other case when the microprocessor was executing from the secondary page when the interrupt occurred. As will be understood by those skilled in the art, the two paths illustrated will not occur simultaneously.

When an interrupt occurs, the microprocessor 12 senses the interrupt condition at the interrupt input 38. If interrupt detection is not disabled, the microprocessor automatically completes the execution of the execution instruction which it is currently executing before taking further action. Next, the address of the next instruction to be executed (if the interrupt had not occurred) is stored by the processor within its internal random access memory 40 in performing an operation known in the art as stacking. The operation of storing the next instruction to be executed within the random access memory is referred to in the art as placing the next address on the top of the internal random access memory or stack of the microprocessor 12.

If the interrupt occurred during a time when the microprocessor was performing executions from program instructions obtained from the primary page 14, normal execution is suspended and the microprocessor vectors to the interrupt service routines 14a for the particular interrupt service routine required for servicing the particular interrupt which has occurred. As previously mentioned, all interrupt service routines 14a for the system are stored in the lower 16,000 bytes of the primary page 14 between addresses 0000H to 3FFFH.

If the interrupt occurs during a time in which the microprocessor is executing program instructions obtained from the secondary page, normal execution is suspended and the microprocessor vectors to the interrupt service routines. Since all interrupt service routines are below 4000H in the primary page 14, the interrupt override 74 of the memory select control 22 disables the secondary page and enables the primary page without altering the state of the page latch 72. As a result, the page latch 72 will maintain a logical one at its output to force selection of the secondary page once the microprocessor completes the appropriate interrupt service routine.

As previously described with respect to FIG. 2, the primary page library modules 14b are also stored in the lower 16,000 bytes of the primary page 14 along with the interrupt service routines. As a result, any library module subroutines needed during the execution of the interrupt service routine are readily accessible by the microprocessor. This is particularly important for the case when the microprocessor had been executing program instructions from the secondary page at the time of the interrupt, since the page latch cannot be altered to execute the library modules. In fact, erroneous operation could result if the library modules were not stored below address 4000H in the case where the microprocessor was executing program instructions obtained from the secondary page at the time of the interrupt.

When the microprocessor completes the interrupt service routine, a return from interrupt control instruction (RETI) is executed by the microprocessor to return back to the execution module which had been suspended at the time of the interrupt. When the return from interrupt instruction is executed, the microprocessor retrieves the return address from the top of its internal stack (random access memory 40). For both cases when the microprocessor had been executing program instructions obtained from the primary page at the time of the interrupt or when the microprocessor had been executing program instructions obtained from the secondary page at the time of the interrupt, the page latch was never altered. As a result, the unaltered state of the page latch together with the return address supplied from the internal random access memory 40 of the microprocessor 12 result in the microprocessor returning back to the correct address in the proper page.

Figure 8:
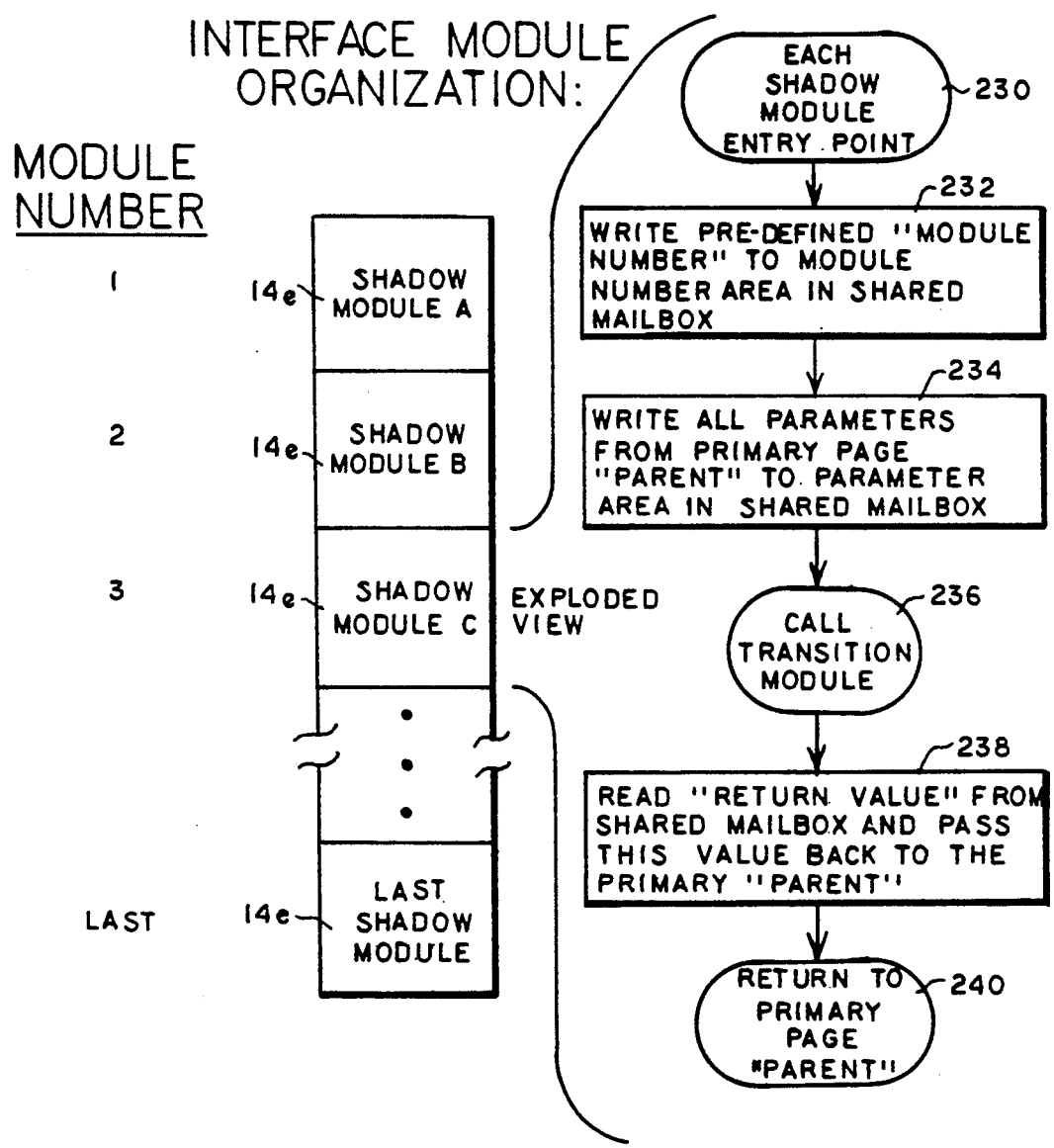
FIG. 8 is a diagrammatic illustration of the configuration of the interface modules of the primary and secondary pages of FIG. 1 and the manner in which the interface modules may be implemented.

Referring now to FIG. 8, it diagrammatically illustrates the organization of the interface modules of the primary and secondary pages 14 and 16 and illustrates in flow chart form the executions of the microprocessor 12 in executing the program instructions obtained from one of the shadow modules. As can be seen in FIG. 8, each interface module includes a plurality of shadow modules, for example shadow modules 14e with reference to the primary page and a corresponding module index number. For example, shadow module A is assigned module index number 1, shadow module B is assigned module index number 2, and shadow module C is assigned module index number 3. When a transition from one page to the other page is required, such as when a transition from the primary page 14 to the secondary page 16 is required, here when shadow module C within the interface module of the primary page 14 is to be executed, shadow module C first causes the microprocessor to enter the shadow module C at the entry point in accordance with step 230. Next, shadow module C will cause the microprocessor to write the predefined module index number to the module number area in the shared mailbox 18d of the random access memory 18 in accordance with step 232. Here, shadow module C causes the microprocessor to write the module index number 3 into the shared mailbox. Next, in step 234, the shadow module C causes the microprocessor to write all parameters from the primary page parent to the parameter area in the shared mailbox 18d. After completing step 234, the shadow module C of the interface module, in step 236, causes the microprocessor to fetch program instructions from the transition module for transitioning to the opposite page, here, the secondary page.

After completion of the actual module C by the processor from program instructions obtained from the secondary page, the microprocessor transitions from the secondary page back to the primary page and more specifically, the transition module of the transition module of the primary page. The transition module of the primary page then causes the microprocessor to return to the shadow module C of the interface module for reading the return value from the shared mailbox and passing the return value to the execution module which originally called shadow module C. This is performed in step 238 and may be implemented by storing the return value in the primary private random access memory portion 18a of the random access memory. Lastly, in step 240, the microprocessor returns to processing the execution module calling the shadow module C by executing the execution module from program instructions obtained from the primary page.

Figure 9:
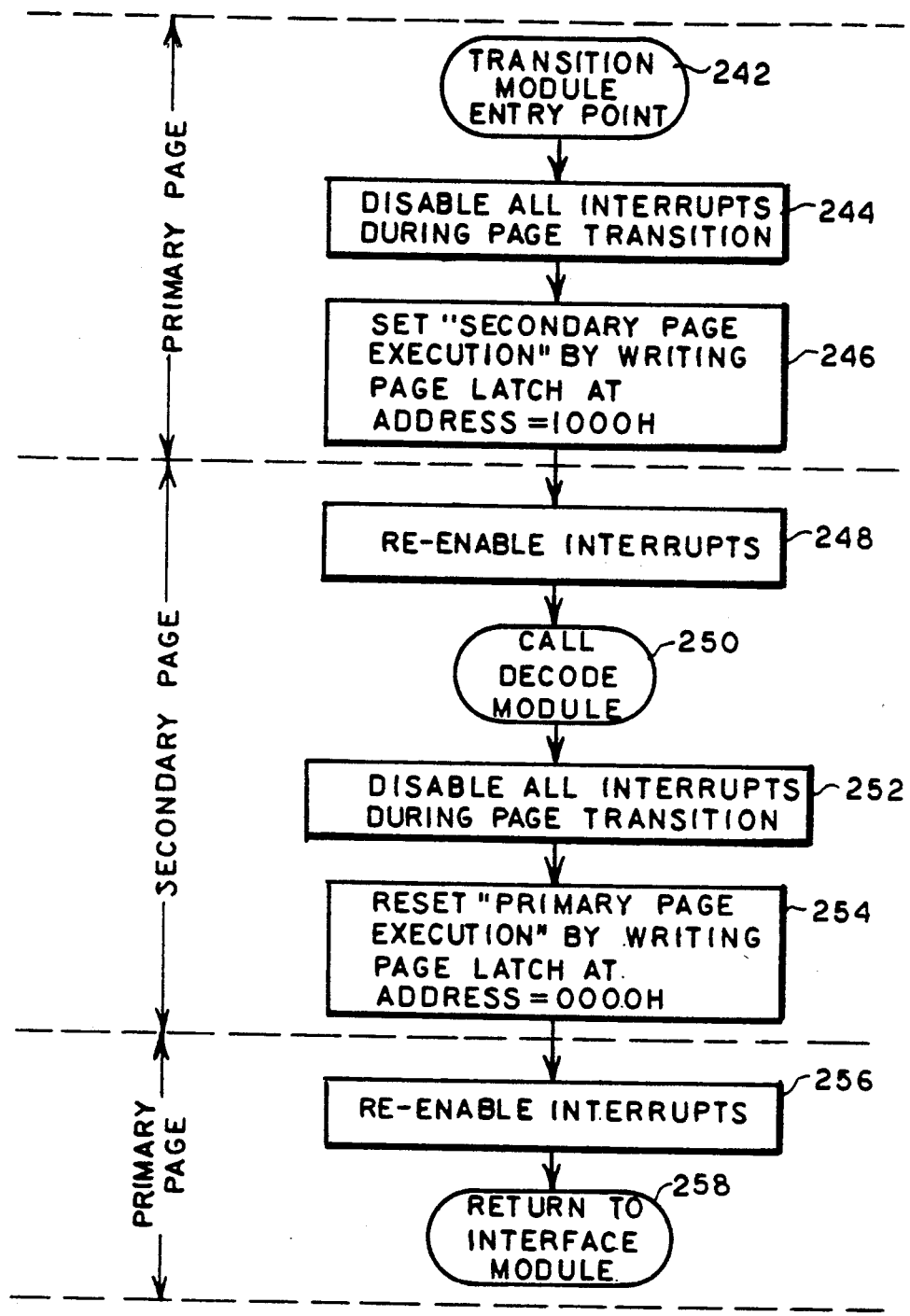
FIG. 9 is a flow chart illustrating the manner in which the transition modules of the primary and secondary pages may be implemented in accordance with the present invention.

Referring now to FIG. 9, it illustrates the manner in which the transition modules may be implemented in accordance with the present invention for a transition from the primary page to the secondary page and then back from the secondary page to the primary page. The microprocessor enters the transition module at the entry point in step 242. In step 244, the transition module then causes the microprocessor to disable all interrupts during the page transition. Next, in step 246 the transition module causes the microprocessor to set the page latch for executing from the secondary page by writing the page latch with address 1OOOH.

After the page transition, the transition module of the secondary page causes the microprocessor in step 24 to reenable interrupt detection and servicing. After step 248, in step 250, the transition module of the secondary page causes the microprocessor to fetch program decode instructions from the decode module of the secondary page. After the microprocessor completes the execution of the execution module called for by the shadow module of the primary page, the transition module of the secondary page in step 252 causes the microprocessor to disable all interrupts to condition the system for the page transition from the secondary page back to the primary page. Next, in step 254, the transition module of the secondary page causes the microprocessor to reset the page latch for execution from the primary page by writing the page latch with address OOOOH. After the page transition, the transition module of the primary page causes the microprocessor to reenable interrupt detection and servicing. Lastly, in step 258, the transition module of the primary page causes the microprocessor to fetch interface program instructions from the interface module of the primary page.

Figure 10:
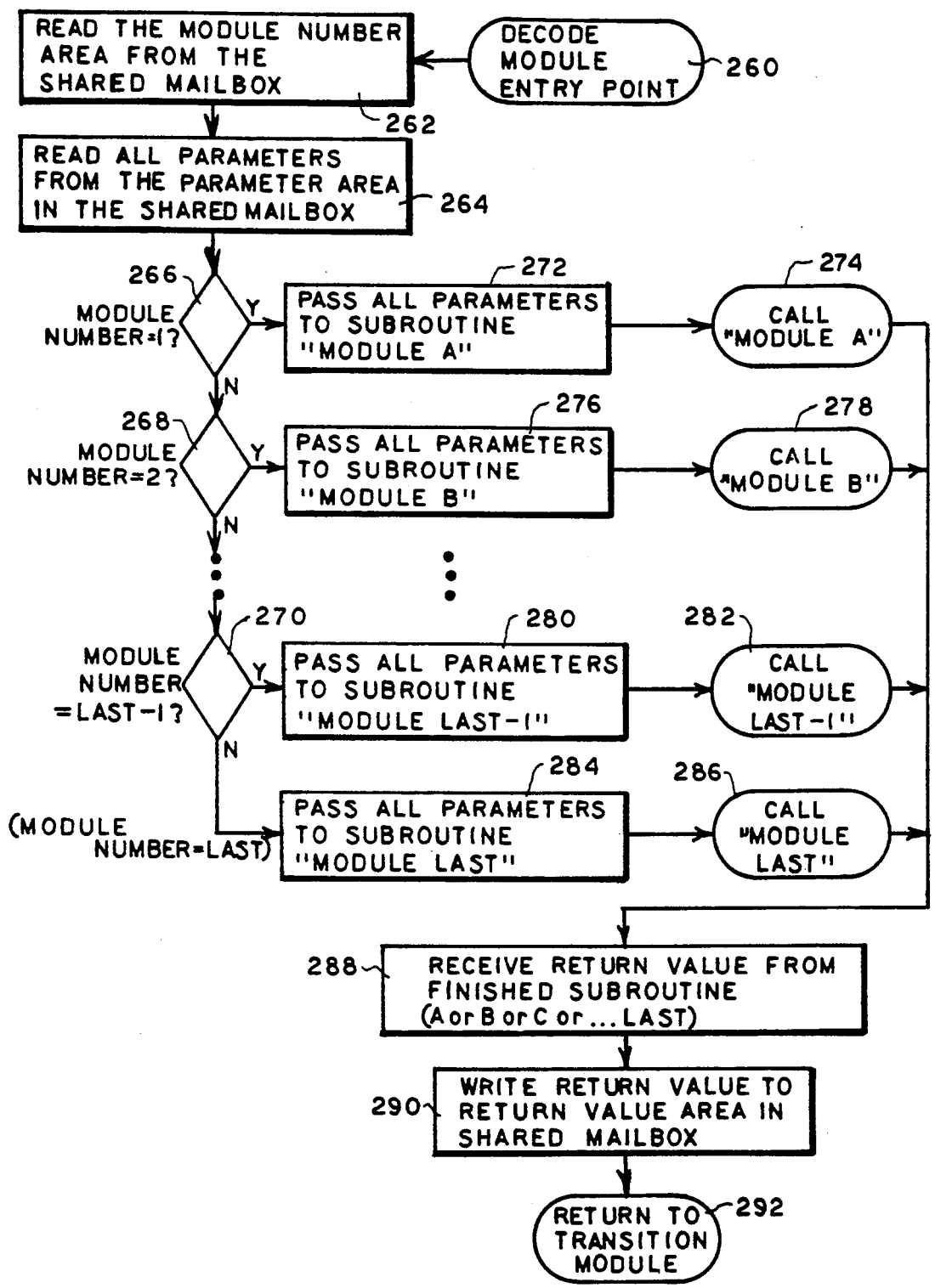
FIG. 10 is a flow chart illustrating the manner in which the decode modules of the primary and secondary pages of FIG. 1 may be implemented in accordance with the present invention.

Referring now to FIG. 10, it illustrates the manner in which the decode modules of the primary and secondary page may be implemented in accordance with the present invention. The microprocessor enters the decode module at step 260. The decode module then, in step 262, causes the microprocessor to read the module index number from the module index number area of the shared mailbox. Next, in step 264, the decode module causes the microprocessor to read all parameters from the parameter area of the shared mailbox which are required for processing the actual module. Next, in step 266, the decode module causes the microprocessor to determine if the module index number is index number 1. If it is not, the microprocessor is then caused by the decode module to enter step 268 to determine if the module index number is number 2. If it is not, the decode module continues to cause the microprocessor to determine which module index number was stored in the shared mailbox until reaching the last module number in step 270.

If the module index number was equal to 1, the microprocessor is caused by the decode module in step 272 to pass all of the parameters to the required subroutine (module A). The decode module then causes the microprocessor to execute the subroutine module A in step 274.

Similarly, if the index number had been number 2, the decode module would cause the microprocessor in step 276 to pass all parameters to that subroutine and then cause the microprocessor in step 278 to execute that module, module B. The microprocessor is caused to execute similar steps with respect to the other module index numbers to the last such module number in accordance with steps 280, 282, 284, and 286 in a similar manner.

After the microprocessor completes the execution of the appropriate subroutine module, it is caused by the decode module to receive the return value from the finished subroutine in step 288. Thereafter, in step 290, the microprocessor is caused by the decode module to write the return value to the shared mailbox. Lastly, in step 292, the decode module causes the microprocessor to return to the transition module for executing a page transition to the other or parent page.

While a particular embodiment of the present invention has been shown and described, modifications may be made, and it is therefore intended in the appended claims to cover all such changes and modifications which fall within the true spirit and scope of the invention.

What is claimed is:

1. A processing system comprising: processor means for executing program instructions, said
  processor means including means for generating
  address for fetching said program instructions; primary memory means, coupled to said processor means, for
  storing a first set of program instructions including a first set of execution program instructions and a plurality of transition program instructions, and for providing said processor means with said first set of program instructions;
  secondary memory means, coupled to said processor means, for storing a second set of program instructions including a second set of execution program instructions and said plurality of transition program instructions, and for providing said processor means with said second set of program instructions;
  wherein each of said plurality of transition program instructions in said primary memory means has a corresponding transition program instruction in said plurality of transition program instructions in said secondary memory means, each transition program instruction in said primary memory means belong stored in said primary memory means at a selected address, said corresponding transition program instruction in said secondary memory means being stored at an address in said secondary memory means identical to said selected address; and
  control means, coupled between said processor means and said primary and secondary memory means, for selecting either said primary memory means or said secondary memory means, said control means being responsive to a select-primary address generated by said processor means for selecting said primary memory means, said control means being responsive to a select-secondary address generated by said processor means for selecting said secondary memory means, said select-primary address being different than said select-secondary address, said processor means being responsive to said transition program instructions fetched from one of said primary memory means and said secondary memory means for generating one of said select-primary address and said select-secondary address to cause said control means to select the other one of said primary memory means and said secondary memory means when the execution of execution program instructions by said processor means requires the fetching of execution program instructions from said other one of said primary memory means and said secondary memory means, and said control means including latch means for maintaining an identification of which of said primary memory means and said secondary memory means is selected.

2. A processing system as defined in claim 1 further including third memory means for temporarily storing data, said processor means being arranged for storing in said third memory means data required for executing said execution program instructions from said other one of said primary memory means and said secondary memory means prior to generating said one of said select-primary address and said select-secondary address.

3. A processing system as defined in claim 2 wherein said processor means is arranged for generating the other one of said select-primary address and said select-secondary address for causing said control means to select said one of said primary memory means and said secondary memory means after completing execution of said execution program instructions from said other one of said primary memory means and said secondary memory means.

4. A processing system as defined in claim 3 wherein said processor means is responsive to said transition program instructions fetched from said other one of said primary memory means and secondary memory means for generating said other one of said select-primary address and said select-secondary address.

5. A processing system as defined in claim 4 wherein said processor means is arranged for storing in said third memory means resultants from executing said execution program instructions from said other one of said primary memory means and said secondary memory means prior to generating said other one of said select-primary address and said select-secondary address.

6. A processing system as defined in claim 5 wherein said transition program instructions in said primary memory means correspond to said transition program instructions in said secondary memory means, wherein said corresponding ones of said transition program instructions stored in said primary and secondary memory means reside at identical addresses of said primary and secondary memory means.

7. A processing system as defined in claim 3 wherein said primary memory means further includes a plurality of interrupt service routine instructions, wherein said processor means is responsive to an interrupt condition for generating an interrupt service routine address for fetching one of said plurality of interrupt service routine instructions, and wherein said processor means is responsive to said transition program instructions of said one of said primary memory means and said secondary memory means for being disabled from generating an interrupt service routine address immediately prior to generating said one of said select-primary address and said select-secondary address.

8. A processing system as defined in claim 7 wherein said processor means is further responsive to said transition program instructions of said other one of said primary memory means and said secondary memory means for being enabled to generate an interrupt service routine address immediately after generating said other one of said select-primary address and said select-secondary address.

9. A processing system as defined in claim 1 wherein said first and second sets of execution program instructions stored in said primary and secondary memory means respectively are divided into a plurality of execution program modules, each of said plurality of execution program modules being provided with a unique program identifier.

10. A processing system as defined in claim 9 wherein each of said plurality of execution program modules resides entirely within said primary memory means or said secondary memory means.

11. A process system as defined in claim 10 wherein each of said plurality of execution program modules resides entirely within only one of said primary memory means and said secondary memory means.

12. A processing system as defined in claim 11 wherein said primary memory means includes a first interface module for storing the program identifiers of those of said plurality of execution program modules which are stored in said secondary memory means which are required to be executed in the execution of the execution program modules stored in said primary memory means, and said secondary memory means includes a second interface module for storing the program identifiers of those of said plurality of execution program modules which are stored in said primary memory means which are required to be executed in the execution of the execution program modules stored in said secondary memory means.

13. A processing system as defined in claim 12 wherein said first interface module and said second interface module each include, with each said program identifier, an identification of any data required in the execution of the execution program module corresponding to each said program identifier.

14. A processing system as defined in claim 13 further including third memory means for temporarily storing the program identifier corresponding to the execution program module to be executed from instructions to be fetched from said other one of said primary memory means and said secondary memory means, and said identified required data, prior to said processor means generating said one of said select-primary address and said select-secondary address.

15. A processing system as defined in claim 14 wherein said primary memory means and said secondary memory means each include decode instructions, and wherein said processing means is responsive to said decode instructions for decoding said program identifier stored in said third memory means for addressing, in said other one of said primary memory means and said secondary memory means, said execution program module to be executed after generating said one said select-primary address and said select-secondary address.

16. A processing system as defined in claim 15 wherein said processor means is further responsive to said decode instructions for reading said required data from said third memory means.

17. A processing system as defined in claim 16 wherein said processor means is arranged for generating the other one of said said select-primary address and said select-secondary address for causing said control means to select said one of said primary memory means and said secondary memory means after completing the execution of the execution program module of said other one of said primary memory means and said secondary memory means.

18. A processing system as defined in claim 17 wherein said processor means is responsive to said transition program instructions fetched from said other one of said primary memory means and said secondary memory means for generating said other one of said select-primary address and said select-secondary address.

19. A processing system as defined in claim 18 wherein said processor is arranged for storing in said third memory means resultants from executing said execution program module of said other one of said primary memory means and said secondary memory means prior to generating said other one of said select-primary address and said select-secondary address.

20. A processing system as defined in claim 19 wherein said processor means is further arranged for storing in said third memory means the program identifier of the execution program module of said one of said primary memory means and said secondary memory means to be next executed by said processor means along with said resultant data responsive to instructions fetched from said interface module of said other one of said primary memory means and said secondary memory means prior to generating said other one of said select-primary address and said select-secondary address.

21. A processing system as defined in claim 20 wherein said transition program instructions in said primary memory means correspond to said transition program instructions in said secondary memory means, wherein said corresponding ones of said transition program instructions stored in said primary and secondary memory means reside at identical addresses of said primary and secondary memory means.

22. A processing system as defined in claim 1 further including a plurality of interrupt service routine instructions stored in said primary memory means to permit said processor means to execute a plurality of interrupt service routines, and wherein said control means selects said primary memory means responsive to said processor means generating an address corresponding to any one of said plurality of interrupt service routine instructions to execute an interrupt service routine of said plurality of interrupt service routines.

23. A processing system as defined in claim 22 wherein said latch means maintains said identification of which of said primary memory means and said secondary memory means is selected immediately prior to the beginning of an interrupt service routine.

24. A processing system as defined in claim 23 wherein said latch means causes said control means to select said secondary memory means after said interrupt service routine is completed if said secondary memory means had been selected immediately prior to the beginning of said interrupt service routine.

25. A processing system as defined in claim 23 wherein said control means is arranged for selecting said primary memory means responsive to said processor means generating an address corresponding to an interrupt service routine instruction independently from said latch means.

26. A processing system as defined in claim 22 wherein said plurality of interrupt service routine instructions are stored in said primary memory means at a plurality of interrupt service routine memory locations which are contiguous with respect to each other.

27. A processing system as defined in claim 26 wherein said primary memory means includes a plurality of ordered memory locations including a first memory location, wherein said plurality of interrupt service routine memory locations begin at said first memory location of said primary memory means.

28. A processing system as defined in claim 26 wherein said secondary memory means includes a plurality of data constants stored at a plurality of data constant memory locations within said secondary memory means, said plurality of data constant memory locations in said secondary memory means corresponding to said interrupt service routine memory locations in said primary memory means.

29. A processing system as defined in claim 28 wherein said control means selects said secondary memory means responsive to said processor means generating an address for reading any one of said plurality of data constants.

30. A processing system as defined in claim 29 wherein said primary memory means and said secondary memory means each comprise ordered memory locations including a first memory location, said plurality of interrupt service routine memory locations beginning at said first memory location in said primary memory means, and said plurality of data constant memory locations beginning at said first memory location in said secondary memory means.

31. A processing system as defined in claim 30 wherein said primary and secondary memory means each comprise a read only memory.

32. A processing system as defined in claim 31 wherein said read only memories comprise erasable programmable read only memories.

33. A method for selecting either a primary memory or a secondary memory for accessing by a processor and including the steps of:
  providing said processor,
  providing said primary memory and said secondary memory, said primary memory and said secondary memory being addressable by said processor;
  coupling said processor to said primary memory and to said secondary memory;
  said processor for executing program instructions fetched from said primary and secondary memories;
  providing a latch means; and
  providing control means coupled to said processor and to said primary and secondary memories, said control means being responsive to a first address from said processor for selecting said primary memory and being responsive to a second address from said processor for selecting said secondary memory;

said method further including the computer implemented steps of:

storing a first plurality of said program instructions in said primary memory;

storing a second plurality of said program instructions in said secondary memory;

providing said first address from said processor to cause said control means to select said primary memory providing said second address from said processor to cause said control means to select said secondary memory;

storing corresponding transition program instructions in said primary and secondary memories at identical addresses of said primary and secondary memories;

causing said processor to fetch said transition program instructions from one of said primary and secondary memories for providing one of said first and second addresses to said control means when the execution of program instructions by said processor requires the execution of program instructions from the other one of said primary memory and said secondary memory to cause said control means to select the other one of said primary memory and said secondary memory; and causing said latch to maintain an identification of which of said primary memory means and said secondary memory means is selected.

34. A method as defined in claim 33 further including the computer implemented steps of storing a plurality of interrupt service routine instructions in said primary memmory and causing said control means to select said primary memory whenever said processor provides an address corresponding to one of said plurality of interrupt service routine instructions.

35. A method as defined in claim 34 further including the computer implemented step of storing said plurality of interrupt service routine instructions at contiguous addresses of said primary memory.

36. A method as defined in claim 35 wherein said primary memory includes a plurality of ordered memory addresses including a first memory address, the method further including the computer implemented step of storing said plurality of interrupt service routine instructions in said primary memory starting with said first memory address of said primary memory.

37. A method as defined in claim 34 wherein a particular memory of said primary memory and said secondary memory is selected at a time said processor provides an address corresponding to a specified interrupt service routine, the method further including the computer implemented step of causing said control means to select said particular memory after completion of said specified interrupt service routine.

38. A method as defined in claim 37 further including the step of providing a third memory, and the computer implement steps of causing said processor to store in said third memory a next address to be provided by said processor before providing said address corresponding said specified interrupt service routine, causing said processor to read from said third memory said next address after completing said specified interrupt service routine and, thereafter, causing said processor to provide said next address.

39. A method as defined in claim 34 further including the computer implemented step of providing a first conditioning signal with said first and second addresses.

40. A method as defined in claim 39 further including the computer implement steps of providing a second conditioning signal with said first address when said first address corresponds to any of said plurality of interrupt service routine instructions, and providing a second conditioning signal with said second address when said first second corresponds to any of said plurality of interrupt service routine instructions.

41. A method as defined in claim 40 further including the computer implemented steps of storing a plurality of data constants in said secondary memory and causing said control means to select said secondary memory whenever said processor provides an address corresponding to a data constant of said plurality of data constants.

42. A method as defined in claim 41 further including the computer implemented step of storing said plurality of data constants in said secondary memory at addresses corresponding to the storage addresses of said plurality of interrupt service routine instructions stored in said primary memory.

43. A method as defined in claim 42 further including the computer implemented step of storing said plurality of interrupt service routine instructions and said plurality of data constant at contiguous addresses in said primary and secondary memories respectively.

44. A method as defined in claim 43 wherein said primary memory and said secondary memory each comprise ordered memory locations including a first memory location, further including the computer implemented steps of storing said plurality of interrupt service routine instructions beginning at said first memory location in said primary memory, and storing said plurality of data constants beginning at said first memory location in said secondary memory.

45. A method as defined in claim 41 wherein a particular memory of said primary memory and said secondary memory was selected at the time said processor provided said address for reading said data constant, the method further including the computer implemented step of causing said control means, after said processor reads said data constant, to select said particular memory.

46. A method as defined in claim 33 further including the computer implemented steps of providing a third memory for temporarily storing data, and causing said processor to store in said third memory data required for executing said program instructions from said other one of said primary memory and secondary memory prior to generating said one of said first and second address.

47. A method as defined in claim 46 further including the computer implemented step of causing said processor to provide the other one of said first and second addresses after completing the execution of said program instructions from said other one of said primary memory and said secondary memory for causing said control means to select said one of said primary memory and secondary memory.

48. A method as defined in claim 47 further including the computer implemented step of causing said processor to fetch said transition program instructions from said other one of said primary memory and secondary memory for providing said other one of said first and second addresses.

49. A method as defined in claim 48 further including the computer implemented step of causing said processor to store in said third memory results from executing said program instructions from said other one of said primary memory and secondary memory prior to providing said other one of said first and second addresses.

50. A method as defined in claim 49 wherein said transition program instructions in said primary memory correspond to said transition program instructions in said secondary memory, the method further including the computer implemented step of storing said corresponding ones of said transition program instructions stored in said primary and secondary memories at identical addresses of said primary and secondary memories.

51. A method as defined in claim 47 further including the computer implemented steps of storing in said primary memory a plurality of interrupt service routine instructions, causing said processor to respond to an interrupt condition by providing an interrupt service routine address for fetching one of said plurality of interrupt service routine instructions, and disabling said processor from providing an interrupt service routine address immediately prior to providing said one of said first and second addresses responsive to said transition program instructions of said one of said primary memory and secondary memory.

52. A method as defined in claim 51 further including the computer implemented step of enabling said processor to provide an interrupt service routine address immediately after generating said other one of said first and second addresses responsive to said transition program instructions of said other one of said primary memory and secondary memory.

53. A method as defined in claim 33 further including the computer implemented steps of dividing said program instructions stored in said primary memory and said secondary memory respectively into execution program modules and providing each said execution program module with a unique program identifier.

54. A method as defined in claim 53 further including the computer implemented steps of storing each said execution program module entirely within said primary memory and said secondary memory.

55. A method as defined in claim 54 including the computer implemented step of storing each said execution program module entirely within only one of said primary memory or said secondary memory.

56. A method as defined in claim 55 wherein said primary memory includes a first interface module and said secondary memory includes a second interface module, further including the computer implemented steps of storing in said first interface module the program identifiers of those of said plurality of execution program modules which are stored in said secondary memory which are required to be executed in the execution of the execution program modules stored in said primary memory, and storing in said second interface module the program identifiers of those of said plurality of execution program modules which are stored in said primary memory which are required to be executed in the execution of the execution program modules stored in said secondary memory.

57. A method as defined in claim 56 further including the computer implemented steps of storing in each of said first interface module and said second interface module, with each said program identifier, a required data identification which identifies any data required in the execution of the execution program module corresponding to each said program identifier.

58. A method as defined in claim 57 wherein said one of said first address and said second address corresponds to an instruction to be fetched from said other one of said primary memory and said secondary memory, wherein said instruction belongs to a particular execution program module in said other one of said primary memory and said secondary memory, further including the computer implemented steps of providing a third memory and temporarily storing in said third memory the program identifier corresponding to said particular execution program module and the data identified in the rehired data identification of said particular program module prior to causing said processor to provide said one of said first and second addresses.

59. A method as defined in claim 58 further including the computer implemented steps of storing in each of said primary and secondary memories decode instructions and causing said processor, responsive to said decode instructions, to code said program identifier stored in said third memory for addressing, in said other one of said primary memory and said secondary memory, said particular execution program module.

60. A method as defined in claim 59 further including the computer implemented step of causing said processor to read said required data from said third memory responsive to said decode instructions.

61. A method as defined in claim 60 further including the computer implemented step of causing said processor to provide the other one of said first and second addresses for causing said control means to select said one of said primary memory and said secondary memory after completing the executing of said particular execution program module.

62. A method as defined in claim 61 further including the computer implemented step of causing said processor to fetch said transition program instructions from said other one of said primary memory and said secondary memory for generating said other one of said first and second addresses.

63. A method as defined in claim 62 further including the computer implemented step of causing said processor to store in said third memory resultants from executing said particular execution program module prior to said processor providing said other one of said first and second addresses.

64. A method as defined in claim 63 further including the computer implemented steps of causing said processor, prior to providing said other one of said first and second addresses, to store in said third memory the program identifier of the execution program module of said one of said primary memory and said secondary memory to be next executed by said processor along with said resultant data responsive to instructions fetched from said interface module of said other one of said primary memory and said secondary memory.

* * * * *